United States Patent Office 2,897,342
Patented July 28, 1959

2,897,342

ARC WELDING APPARATUS

Harry J. Bichsel, East Aurora, and Alfred J. Baeslack, Clarence, N.Y., assignors to Westinghouse Electric Corporation, East Pittsburgh, Pa., a corporation of Pennsylvania Application December 29, 1955, Serial No. 556,143

2 Claims. (Cl. 219—130)

This invention relates to arc welding apparatus and has particular relation to arc welding of the consumable electrode gas-shielded type. This application is a continuation-in-part of application Serial No. 465,600, filed October 29, 1954, and assigned to Westinghouse Electric Corporation now patent 2,823,331 (hereinafter called parent patent).

In the parent patent, apparatus for manual or semi-automatic arc welding with a consumable electrode in a gas shield is disclosed. In such apparatus the electrode is passed through a hand gun having channels for transmitting a shielding gas and a cooling fluid, inching and trigger switches and facilities for adjusting the speed of the electrode, and the movement of the electrode is controlled entirely by an operator who manipulates the switches and adjusts the electrode speed in accordance with the requirements of the welding operation. The apparatus as specifically disclosed in the parent aplication does not lend itself readily to fully automatic welding, and it is broadly an object of this invention to provide fully automatic arc welding apparatus of the consumable electrode gas-shielded type.

This invention in its broader aspects arises from the realization that the critical portion of a welding operation which most requires the attention of an operator is the start of the operation. During this portion of the operation, potential is impressed between the electrode and the work, and the electrode is advance towards the work until it touches the work, striking the arc. It is essential that the speed at which the electrode is advanced towards the work be carefully controlled to avoid bending or breaking of the electrode or damage to the work. In addition, during the starting operation, it is desirable that the channel through which the shielding gas is transmitted and the work itself be prepurged of atmospheric gases to prevent oxidation of the weld by such gases.

In accordance with this invention, apparatus and a method are provided in the use and practice of which the electrode is advanced at a relatively low speed until it touches the work and strikes the arc, and while the electrode is being so advanced, shielding gas is passed through the gas channel to purge the channel and the work. Once the arc is struck the electrode is fed into the arc at the higher welding speed. The speed at which the electrode is advanced towards the work before the arc is struck is set, not only so as to prevent damage to the tip of the electrode when it strikes the work, but also so that the gas channel and the work are effectively purged before the arc is struck and the melting of the material begins. An important feature of this invention in its specific aspects is that the transition from the starting speed to the welding speed is effected in response to the flow of current between the electrode and work.

In automatic welding the electrode is advanced by a motor through the electrode channel of a gun or torch such as is disclosed in Patent 2,813,193, to Harry J. Bichsel, assigned to Westinghouse Electric Corporation while a potential is impressed between the electrode and the work from a power supply unit to produce an arc. This gun or torch, unlike the one used with the apparatus disclosed in the parent patent, does not include an inching switch, a starting trigger switch and facilities for varying the speed of the electrode. Manual arc welding apparatus in accordance with the parent patent may be converted into automatic arc welding apparatus in accordance with this invention by providing the above-mentioned components and in addition means for setting the speed of the electrode during starting, on a separate panel, or welding apparatus having the above components integrated therein may be provided.

The novel features considered characteristic of this invention are discussed generally above. The invention itself both as to its organization and its method of operation, together with additional objects and advantages thereof, will be understood from the following description of a specific embodiment when read in connection with the accompany drawings in which:

Fig. 2 is presented for the purpose of aiding those skilled in the art in practicing this invention, and not with any intention of limiting the scope of the invention. Equivalents of the components included in Fig. 2, both as to magnitude and as to kind, are known to those skilled in the art, and any use of such equivalents shall not constitute a departure from the scope of this invention.

Figure 1:
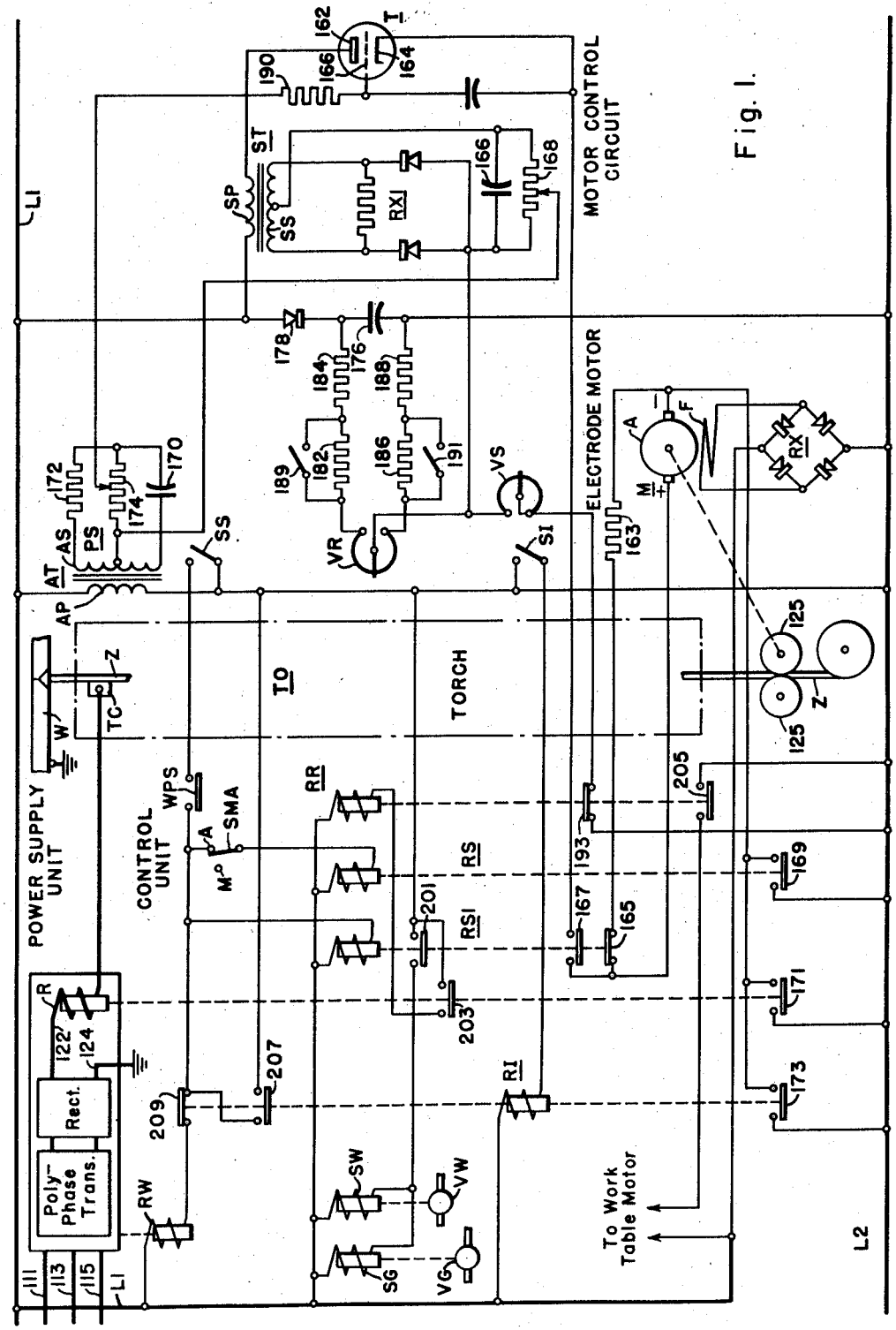
Figure 1 is a circuit diagram showing a preferred embodiment of this invention.
Figure 2:
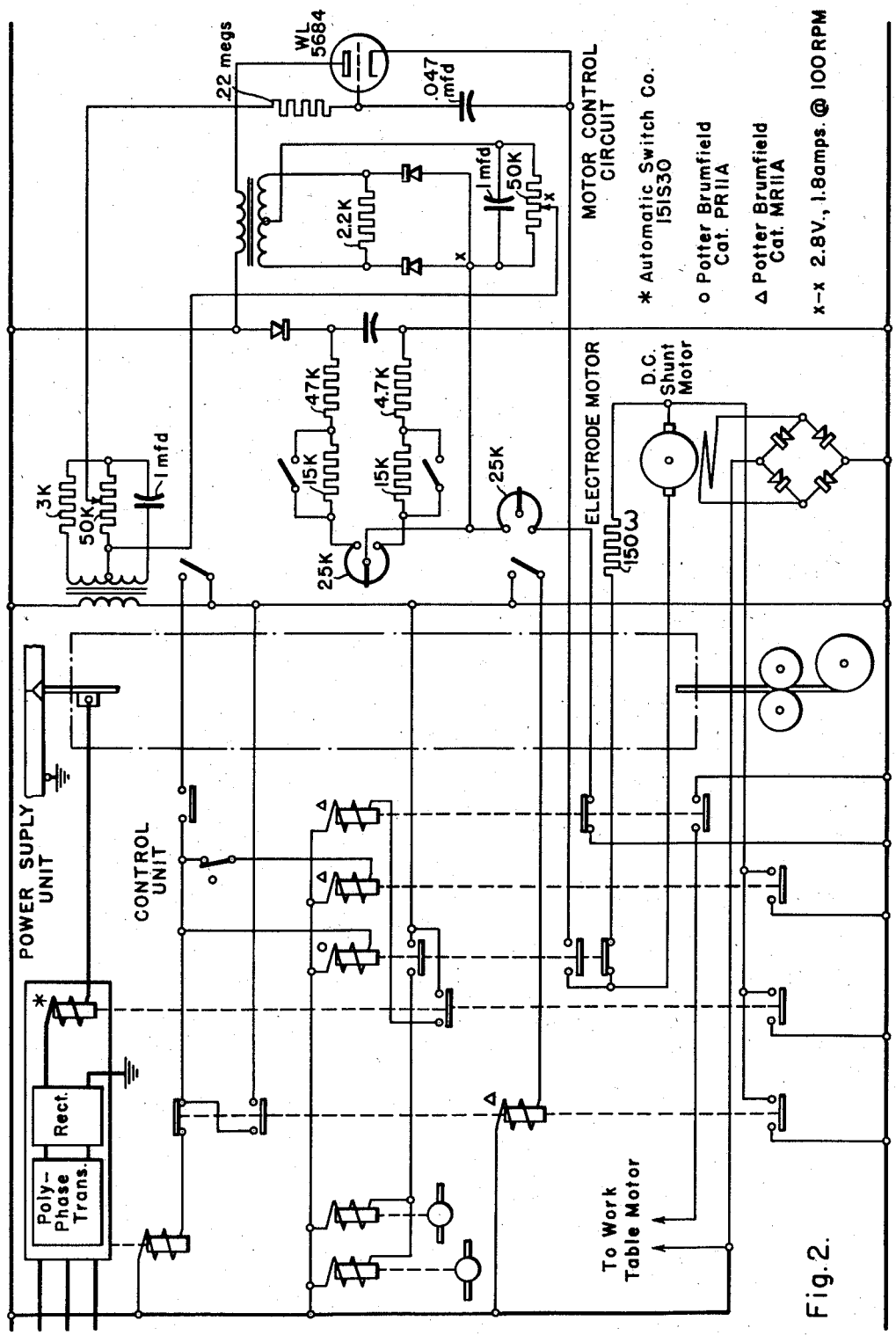
Fig. 2 is a circuit diagram similar to Fig. 1 but showing the magnitudes of the components of an embodiment of this invention which has been constructed and found to operate highly satisfactorily.

The apparatus shown in Fig. 1 includes a Torch to an Electrode Motor for driving the electrode Z through the Torch to, a Motor Control Circuit for controlling the operation of the Electrode Motor, a Power Supply Unit for supplying power for welding between the electrode Z and the work and a Control Unit for controlling the operation of the Power Supply Unit and the Motor. The Power Supply Unit is supplied from the conductors 111, 113 and 115 of a three-phase power supply and the remainder of the apparatus from conductors L1 and L2 which may be energized through a step down transformer (not shown) from one of the phases of the three-phase supply.

The Torch To may be of the automatic type disclosed in the above-mentioned Bichsel patent.

The Power Supply Unit is of the same type as that disclosed in the parent application. It includes a polyphase transformer and a rectifier. The rectifier has a pair of output terminals 122 and 124, one of which, 124, is grounded and connected through ground to the work W and the other of which, 122, is connected through the coil of a current relay R and a conductor TC, which may be included in the electrode guide channel in the Torch To, to the electrode Z. The coil of the current relay R may constitute a single loop of the conductor 122.

The Power Supply Unit is controlled from a welding relay RW. When this relay is actuated, potential is impressed between the conductors 122 and 124 and through them between the electrode Z and the work W. When relay RW is deenergized there is no potential between the electrode Z and the work W.

The Electrode Motor is of the shunt type having an armature A and a shunt field F. The shunt field is supplied through a rectifier RX from conductors L1 and L2. The rotor A is coupled through positively driven rollers 125 to the electrode Z so as to drive the electrode through the Torch To.

A braking resistor 163 is connected across the armature A of the motor when the apparatus is deenergized through the normally closed contacts 165 of the relay RS1. The operation of the Motor is controlled from the Motor Control Circuit.

The Motor Control Circuit includes a thyratron T having an anode 162, a cathode 164 and a control electrode 166. The anode 162 is connected to conductor L1 through the primary SP of a current transformer ST. The cathode 164 is adapted to be connected to the conductor L2 through normally open contacts 167 of a starting relay RS1 in the Control Unit, the armature A of the Motor, and alternatively through normally open contacts 169, 171, 173 of another starting relay RS, the relay R or an inching relay RI, respectively, in the Control Unit. The thyratron T is controlled by a composite potential impressed in its control circuit. This potential includes a direct current component derived from the transformer ST through a rectifier RX1 supplied from the secondary SS of this transformer. The rectifier charges a storage capacitor 166, across which a variable resistor 168 is connected. There is also an alternating current component displaced in phase with reference to the potential impressed between the conductors L1 and L2. This component is derived from a phase shift network PS supplied from the secondary AS of a transformer AT, the primary AP of which is connected between the conductors L1 and L2. The phase shift network PS includes a resistor 172 and a capacitor 170 connected in series across the secondary AS. A variable resistor 174 is connected between the junction of the capacitor 170 and resistor 172 and an intermediate tap of the secondary AS. There are, in addition, two direct current components which are derived from a capacitor 176 charged through a rectifier 178, and are applied alternatively, one during starting and the other during welding. The latter is derived directly from a variable resistor VR connected across the capacitor 176 through two pairs of resistors 182 and 184 and 186 and 188. One resistor of each pair 182 and 186 may be shorted by an associated switch 189 and 191. The magnitude of this controlling component may be set by setting the variable resistor VR. The other of these direct current components is derived from a second variable resistor VS. This resistor is connected between the negative terminal of resistor 168 and L2 through a normally closed contact 193 of a running relay RR in the Control Unit. A further component of the composite potential is the potential drop across the armature A.

The above described components are combined into two control circuits for the thyratron T. One which operates during starting and inching extends from the control electrode 166, through a grid resistor 190, a portion of resistor 174, a portion of resistor 168, a portion of the variable resistor VS (in parallel with a portion of VR, 186 and 188), the normally closed contact 193 of running relay RR, one or more of the normally open contacts 169, 171, 173 of relays RS, R and RI (when they are closed), the armature A, the normally open contact 167 of relay RS1 (when closed) to the cathode 164. The other which is effective during welding extends from the control electrode 166, through the resistor 190, a portion of resistor 174, a portion of resistor 168, a portion of resistor VR, resistors 186, 188, one or more of the normally open contacts 169, 171, of relays RS, R and RI (when RI closes during inching), the armature A, the normally open contact of relay RS1, to the cathode 164. In each of these circuits, the armature A impresses a potential tending to maintain the control electrode 166 more negative than the cathode 164. The potentials impressed through the networks, including the resistors VR and VS, and resistor 168 counterbalance this negative potential. With the normally closed contact 193 of relay RR closed, and variable resistor VS in the control circuit, the control electrode 166 is maintained less positive relative to the cathode 168 than with the normally closed contact open and resistor VR alone in the circuit. Thus, the thyratron T has a lower conductivity when its control circuit includes variable resistor VS than when its control circuit includes variable resistor VR.

The Control Unit includes in addition to the relays RS, RS1, RI, RR and RW, solenoids SW and SG. Solenoid SW controls the valve VW through which cooling fluid, preferably water, is supplied to the Torch To, and solenoid SG controls the valve VG through which the shielding gas is supplied to the Torch To. The Control Unit also includes a starting switch SS and the inching switch SI, both of which are preferably mounted on a panel with variable resistors VR and VS so that they may be readily controlled by the operator.

The relay RS1 includes, in addition to the contacts 165 and 167 in circuit with the Motor, a normally open contact 201 which is adapted to connect the solenoids SW and SG between the conductors L1 and L2. The relay R includes, in addition to the normally open contact 171 in the Motor Control Circuit, a normally open contact 203 which is adapted to connect the coil of relay RR between the conductors L1 and L2. The relay RR, in addition to its normally closed contact 193, includes a normally open contact 205 which is adapted to energize the workable motor (not shown). The relay RI includes, in addition to its normally open contact 173, another normally open contact 207 which is adapted to connect the coils of relays RS1 and RS between the conductors L1 and L2, and a normally closed contact 209 which is adapted to disconnect the coil of relay RW from conductor L2 during inching.

When the start switch SS is closed, the coil of relay RS is adapted to be connected between conductors L1 and L2 through the start switch SS, the water pressure switch WPS which is closed when the water pressure is adequate, and a switch SMA for setting the apparatus to manual or automatic operation which is closed during automatic operation. This switch SMA is shown in the automatic position. The coils of the relays RS1 and RW are also adapted to be connected between the conductors L1 and L2 through the start switch SS and the water pressure switch WPS when the start switch is closed. When the inching switch SI is closed, the coil of the inching relay RI is adapted to be connected between the conductors L1 and L2 through the inching switch SI.

When the apparatus is in standby condition ready for operation, the water pressure switch WPS is closed (if the water pressure is adequate), and the switches SS and SI are open. Under the circumstances, relays RS, RS1, RW and RI are deenergized. There is thus no potential between the conductors 122 and 124, and relay R is deenergized. Because relay R is deenergized, relay RR is deenergized. Variable resistor VS is then connected in the control circuit of thyratron T and the thyratron is adapted to have a low conductivity when rendered conducting. Also, the worktable motor is deenergized. Because relay RS1 is deenergized, solenoids SG and SW are deenergized and valves VG and VW are closed. The supply of gas and water to Torch To is thus prevented. Also, because relay RS1 is deenergized, the braking resistor 163 is connected across the armature A, and the anode circuit of thyratron T is open at normally open contact 167. This anode circuit is also open at the normally open contacts 169, 171, 173 of relays RS, R and RI, which are deenergized.

When a welding operation is to be carried out, the Torch To and the work W are mounted in the proper relative positions and the electrode Z is threaded into the Torch by operating the inching switch SI. Operation of the inching switch SI actuates relay RI. Relay RS1 is then actuated through now closed contact 207 and the braking resistor 163 is disconnected from the armature A. Further, the circuit through the thyratron T is closed at contacts 167 and 169 of relays RS1 and RI, respectively. At its normally closed now open contact 209, relay RI maintains the circuit through relay RW open so that there is no potential between conductors 122 and 124 and relay R is deenergized. Relay RR is then deenergized and thyratron T is controlled from the circuit including resistor VS and, in addition, the worktable motor remains deenergized.

The operation of the inching switch SI thus has the effect only of causing the electrode Z to be advanced at a low speed. The electrode is advanced until it is at the proper position in the nozzle of the Torch. The inching switch SI is then released and the starting switch SS is closed.

The closing of the starting switch SS has the effect of actuating relay RW (through the normally closed contact 209 of relay RI which is now closed). Actuation of relay RW results in the impressing of a potential between conductors 122 and 124, but at this time the electrode Z is retracted from the work W so that there is no current flowing through conductor 122 and relay R remains deenergized. Relay RR then also remains deenergized.

The closing of start switch SS also has the effect of energizing relays RS and RS1. The actuation of relay RS1 causes the solenoids SG and SW to be energized and the valves VG and VW to be opened so that cooling water and gas are supplied to the Torch To. Both begin to flow immediately and the flow of the gas through the channels of the gun has the effect of prepurging the channels and the work W. The relays RS1 and RS and RW are actuated substantially simultaneously so that potential appears between the conductors 122 and 124 and between the electrode Z and the work W substantially at the same time as the purging starts.

The actuation of relay RS1 also disconnects the braking resistor 163 from the armature A and the actuation of relays RS1 and RS closes the circuit through thyratron T and armature A. Since thyratron T is now energized, the motor A rotates. But, at this time relay RR is deenergized, variable resistor VS is in the control circuit of the thyratron T, and the conductivity of the thyratron is low so that the rotation is at a low speed. The electrode Z then advances towards the work W at a low speed while the purging is taking place. The speed may be so set that the gas channels and the work are effectively purged during this time.

Eventually the electrode Z engages the work W and an arc is struck. The flow of current between the electrode Z and the work W now actuates relay R closing its normally open contact 203 and energizing relay RR. On actuation of relay RR, the variable resistor VS is disconnected from the control circuit of thyratron T and the thyratron is controlled from the circuit including variable resistor VR. The conductivity of the thyratron then increases and the motor A operates at a higher speed corresponding to the speed at which it is desired that the electrode be fed into the arc. In addition, the circuit through the worktable motor is closed through the normally open contact 205 of relay RR, and the work is advanced.

At the other normally open contact of relay R which is now closed, the motor circuit is closed independently of the relay RS. The welding now continues. During the welding operation, the feed of the electrode into the arc may be adjusted as may be necessary by properly setting the variable resistor VR.

To stop the welding operation, the switch SS is opened. Relays RW, RS and RS1 are then deenergized. The Motor Control Circuit is now open and the motor A is stopped stopping the feeding of the electrode to the work. The stopping rate of the Motor is controlled by contact 165 of RS1 closing the dynamic braking circuit through resistor 163. In addition, the current flow through the relay R is interrupted and this relay drops out causing relay RR to be deenergized and resetting the apparatus for a new operation.

While a specific embodiment of this invention has been disclosed herein, many modifications thereof are feasible. The invention, therefore, is not to be restricted except insofar as is necessitated by the spirit of the prior art.

We claim as our invention:

1. Arc welding apparatus for welding work with a consumable electrode in a shield of gas comprising in combination, power supply means to be connected to said electrode and work when actuated impressing a potential for producing an arc between said electrode and work, shielding gas supply means when actuated supplying gas to shield said arc, a motor to be connected to said electrode for advancing said electrode to said work, an electric discharge device having an anode, a cathode and a control electrode, normally open circuit means for connecting said anode and cathode in energizing relationship with said motor so that the speed of said motor is determined by the current conducted between said anode and cathode, a first control circuit for said device including said control electrode and cathode and also including means for impressing a first biasing potential between said control electrode and cathode to cause said device to have a first conductivity, a second control circuit for said device including said control electrode and cathode and also including means for impressing a second biasing potential between said control electrode and cathode to cause said device to have a second conductivity higher than said first conductivity, said first biasing potential impressing means including means connected across said second biasing potential for deriving said first biasing potential as a selectable fraction of said second biasing potential, said first circuit being normally closed and said second circuit normally open, selectively operable means connected to said circuit means, said power supply means and said gas supply means for closing said circuit means and actuating said power supply means and said gas supply means substantially simultaneously, whereby said electrode is advanced to said work at a speed corresponding to said first conductivity and after said electrode contacts said work a closed electrical circuit is established through said electrode and work through which arc current flows, and means responsive to said closed circuit while closed as aforesaid and connected to said first and second control circuits for closing said second circuit and opening said first circuit.

2. Arc welding apparatus for welding work with a consumable electrode in a shield of gas comprising in combination, power supply means to be connected to said electrode and work when actuated impressing a potential for producing an arc between said electrode and work, shielding gas supply means when actuated supplying gas to shield said arc, a motor to be connected to said electrode for advancing said electrode to said work, an electric discharge device having an anode, a cathode and a control electrode, normally open circuit means for connecting said anode and cathode in energizing relationship with said motor so that the speed of said motor is determined by the current conducted between said anode and cathode, a first control circuit for said device including said control electrode and cathode and also including means for impressing a first biasing potential between said control electrode and cathode to cause said device to have a first conductivity, a second control circuit for said device including said control electrode and cathode and also including means for impressing a second biasing potential between said control electrode and cathode to cause said device to have a second conductivity higher than said first conductivity, said first biasing potential impressing means including means connected across said second biasing potential for deriving said first biasing potential as a selectable fraction of said second biasing potential, said first circuit being normally closed and said second circuit normally open, selectively operable means connected to said circuit means, said power supply means and said gas supply means for closing said circuit means and actuating said power supply means and said gas supply means substantially simultaneously, whereby said electrode is advanced to said work at a speed corresponding to said first conductivity and after said electrode contacts said work a closed electrical circuit is established through said electrode and work through which arc current flows, and means responsive to the current conducted through said closed circuit while closed as aforesaid, as distinguished from the potential between said electrode and work, and connected to said first and second control circuits for closing said second circuit and opening said first circuit.

References Cited in the file of this patent

UNITED STATES PATENTS

| | | |
|---|---|---|
| 1,508,689 | Glasser | Sept. 16, 1924 |
| 1,508,710 | Noble | Sept. 16, 1924 |
| 1,549,450 | Clarkson | Aug. 11, 1925 |
| 1,731,934 | Noble | Oct. 15, 1929 |
| 2,364,920 | Shaffer | Dec. 12, 1944 |
| 2,504,868 | Muller et al. | Apr. 18, 1950 |
| 2,510,207 | Behnke et al. | June 6, 1950 |
| 2,518,222 | Carpenter et al. | Aug. 8, 1950 |
| 2,776,361 | Essig | Jan. 1, 1957 |
| 2,806,127 | Hackman et al. | Sept. 10, 1957 |